March 28, 1939.  C. D. WEST  2,152,513

POLARIZING ATTACHMENT FOR OPTICAL INSTRUMENTS SUCH AS MICROSCOPES

Filed Feb. 11, 1937

INVENTOR.
Cutler D. West
BY Brown & Jones
ATTORNEYS.

Patented Mar. 28, 1939

2,152,513

UNITED STATES PATENT OFFICE 2,152,513

POLARIZING ATTACHMENT FOR OPTICAL INSTRUMENTS SUCH AS MICROSCOPES

Cutler D. West, Boston, Mass., assignor, by mesne assignments, to Polaroid Corporation, Dover, Del., a corporation of Delaware Application February 11, 1937, Serial No. 125,197

5 Claims. (Cl. 88—40)

This invention relates to new and improved devices for use in systems employing polarized light, and more specifically to improved means for use in connection with optical instruments, such as microscopes and the like.

It is an object of the invention to provide a device of the character described which will efficiently perform the purposes for which it is intended, which is simple and economical of construction, which can be expeditiously, conveniently and safely manipulated, and which can be readily manufactured and assembled.

Another object of the invention is to provide means in devices such as microscopes and the like to polarize the beam of light impinging upon the object being viewed, and polarizing means interposed between the object and the eye of an observer, and to provide such polarizing and analyzing means rotatably about an axis or axes spaced from the axis of the instrument itself whereby as said polarizing or analyzing means is rotated about its axis the position of the polarizing axis thereof in the path of the beam transmitted through the eyepiece of the instrument is altered.

Another object of the invention is to provide an attachment for optical instruments such as microscopes or the like comprising a plurality of light-polarizing elements mounted upon a shaft, for rotation thereof, and adapted to be positioned, when the attachment is affixed to the instrument, in such a manner that one of said elements is between the light source and the object being viewed and the other of said elements is between the object being viewed and the eye of an observer.

A still further object of the invention is to provide an attachment of the character described wherein said polarizing elements are rotatable separately or as a unit, whereby the position of the polarizing axis of either or both of said elements with respect to the beam traversing the eyepiece of the instrument may be altered at will.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

Figure 1:
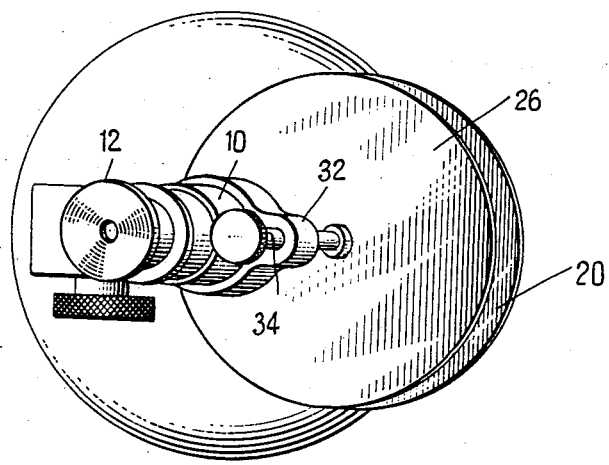
Figure 2:
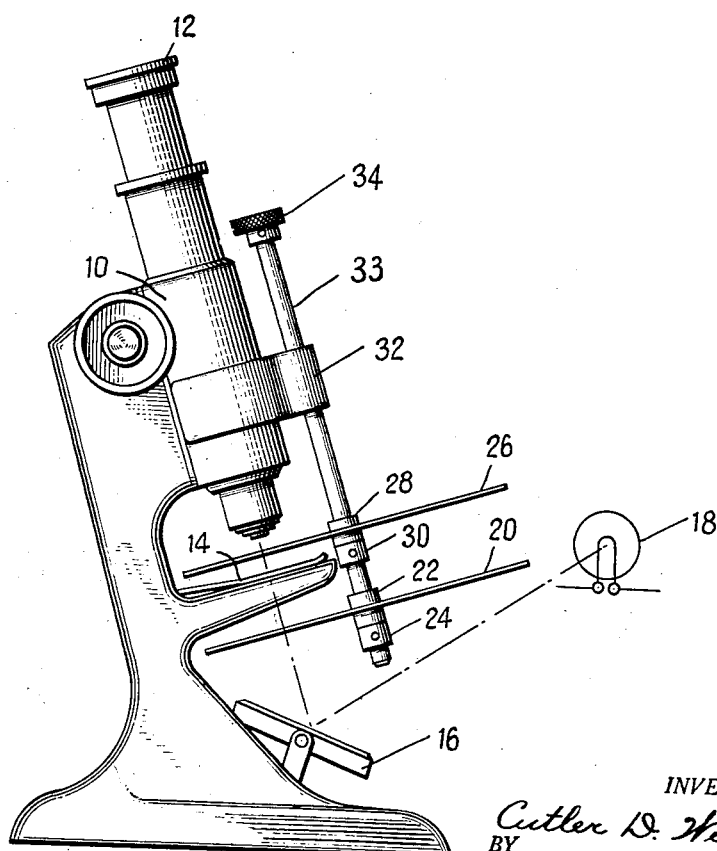

For a fuller understanding of the nature and objects of the invention reference should be had to the following detailed description taken in connection with the accompanying drawing, in which:

Fig. 1 is a view in plan and Fig. 2 a side elevation of a microscope provided with the attachment of the present invention, each view being shown somewhat diagrammatically.

In the examination of objects under polarized light, it is frequently desirable to effect an alteration in the plane of polarization of the beam illuminating the object. It may also be desirable to alter the position of the polarizing axis of the analyzer or the device positioned between the object and the eyepiece of the instrument with respect to the polarizing axis of the polarizer or the device positioned between the light source and the object. It is furthermore highly desirable that certain instruments, and more particularly instruments of the class of microscopes and the like, be provided with polarizing attachments whereby the instrument may be converted rapidly from an instrument employing ordinary light to one employing polarized light. These attachments should if possible possess the properties outlined above, i. e., they should be of a character which permits change in the position of the polarizing axis of either the polarizer or the analyzer, or both, and the attachment should be simple and inexpensive.

This invention contemplates the provision of such an attachment of the character described for microscopes or the like.

In the drawing, 10 represents the barrel of a microscope having an eyepiece 12, a stage 14, and a mirror 16. 18 represents diagrammatically a source of light adapted to throw a beam on to the mirror 16 from which the beam is reflected through the stage 14 and through the lens system of the instrument to the eyepiece 12.

The device of the present invention may comprise a clamp element 32 adapted to frictionally engage the barrel 10 of the instrument and adapted to carry a shaft 33 upon which may be mounted a plurality of thin, preferably sheet-like, substantially rigid light-polarizing elements 20 and 26. As shown in the drawing, the element 20 is adapted, when the attachment is in operative position, to intercept the beam reflected from the mirror 16 before it impinges on the stage 14, and the element 26 is adapted to intercept the beam after it has traversed the stage 14 and before impinging on the lens system of the instrument. The elements 20 and 26 may be mounted for rotation on the shaft 33 as at 22 and 28 respectively, and may be held from slipping along the shaft by the elements 24 and 30, which may be adjustably mounted on the shaft. Preferably the mountings 22 and 28 are such that the elements 20 and 26 will rotate upon rotation of the shaft 33, but the mountings are preferably such that either the element 26 or the element 20 may be separately rotated manually without rotation of the shaft 33. This may be accomplished for example by having the elements 20 and 26 frictionally engage the shaft 33, so that as the shaft is rotated by turning the knob 34, the elements 20 and 26 will rotate with the shaft. If the shaft